United States Patent
Shimada et al.

(10) Patent No.: US 6,453,104 B1
(45) Date of Patent: Sep. 17, 2002

(54) OPTICAL FIBER CABLE AND OPTICAL FIBER CABLE WITH PLUG

(75) Inventors: Katsuhiko Shimada; Kazuki Nakamura, both of Tokyo; Takeshi Kitayama, Toyama; Takara Yamamoto, Toyama; Hiroe Kubo, Toyama; Jun Okumura, Toyama, all of (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 09/914,384

(22) PCT Filed: Dec. 28, 1999

(86) PCT No.: PCT/JP00/09414

§ 371 (c)(1),
(2), (4) Date: Aug. 28, 2001

(87) PCT Pub. No.: WO01/48526

PCT Pub. Date: Jul. 5, 2001

(30) Foreign Application Priority Data

Dec. 28, 1999 (JP) ............................................ 11-374911

(51) Int. Cl.⁷ ................................................. G02B 6/02
(52) U.S. Cl. ...................................... 385/128; 385/102
(58) Field of Search ................................. 385/100, 101, 385/102, 127, 128, 123

(56) References Cited

U.S. PATENT DOCUMENTS

| | | | |
|---|---|---|---|
| 5,093,880 A | * 3/1992 | Matsuda et al. | 385/100 |
| 5,280,060 A |   1/1994 | Abe et al. | |
| 5,703,986 A | * 12/1997 | Brehm et al. | 385/128 X |
| 5,706,381 A | * 1/1998 | Pokorny et al. | 385/100 |
| 6,243,523 B1 | * 6/2001 | Aloisio et al. | 385/128 |

FOREIGN PATENT DOCUMENTS

| | | |
|---|---|---|
| EP | 0 469 542 A2 | 2/1992 |
| EP | 1 031 864 A1 | 12/1999 |
| JP | 50-2552 | 1/1975 |
| JP | 51-86555 | 7/1976 |
| JP | 63-221163 | 9/1988 |
| JP | 3-39710 | 2/1991 |
| JP | 4-89864 | 3/1992 |
| JP | 6-194549 | 7/1994 |
| JP | 50-2552 A | 1/1995 |
| JP | 7-77642 | 3/1995 |
| JP | 10-319281 | 12/1998 |
| JP | 10-332996 | 12/1998 |
| JP | 2000-249878 | 9/2000 |
| JP | 2000-249879 | 9/2000 |
| JP | 2000-275481 | 10/2000 |
| JP | 2000-292659 | 10/2000 |
| JP | 2000-329980 | 11/2000 |

* cited by examiner

*Primary Examiner*—Brian Sircus
*Assistant Examiner*—Son V. Nguyen
(74) *Attorney, Agent, or Firm*—Fitch, Even, Tabin & Flannery

(57) ABSTRACT

An optical fiber cable having a diameter of $D_1$ (mm) and comprising an adhesion layer 0.5 to 200 $\mu$ in thickness, a primary coating layer, and a secondary coating layer, all sequentially formed on the outer circumference of an optical fiber constituted on the outermost layer thereof by vinylidene fluoride polymer, wherein $D_1/D_2$=1.2 to 3.5 (the diameter of the optical fiber is Da (mm), the thickness of the adhesion layer d (mm), and Da+2d=$D_2$); and an optical fiber cable with a plug using this optical fiber. Accordingly, these optical fiber cables are excellent in flame resistance, difficult in separating an optical fiber thereof from coating layers, and not likely to cause a pistoning phenomenon. An optical fiber may consist of a core, a sheath formed on the periphery of the core and a protection layer formed on the periphery of the sheath.

20 Claims, 3 Drawing Sheets

OPTICAL FIBER CABLE AND OPTICAL FIBER CABLE WITH PLUG

This application is the National phase of International Application PCT/JP00/09414, filed Dec. 28, 2000, which designated the U.S. and that International Application was not published under PCT Article 21(2) in English.

TECHNICAL FIELD

The present invention relates to an optical fiber cable and optical fiber cable with plug used for optical signal transmission lines, computer connection lines for high-speed optical communications, lines around exchanges, lines for factory automated machinery control, data transmission lines for automobiles and other moving vehicles, and optical sensor lines.

The present application is based on a patent application filed in Japan (Japanese Patent Application No. Hei 11-374911), and the described contents of said Japanese application are partially incorporated in the present specification.

BACKGROUND ART

Plastic optical fibers (to be simply referred to as "optical fibers") are already used practically in short-distance data communications and sensor applications. At such times, the optical fiber is infrequently used alone, but rather is frequently used in the form of an optical fiber cable in which the outside of the optical fiber is protected with a coating layer. In order to connect such optical fiber cables to a unit incorporated the light source and a sensor as signal sources, or to join the optical fiber cable to another optical fiber cable, the coating layer on the end of the cable is frequently peeled to expose the optical fiber and a plug component is attached to the end of the cable so that it is used in the form of an optical fiber cable with plug.

In such an optical fiber cable with plug, the coefficients of thermal expansion of each of the materials that compose the optical fiber, coating layer, and plug are different. In addition, the optical fiber is easy to contract due to relaxation of its orientation during spinning. Accordingly, phenomenon in which the end of the optical fiber protrudes or retracts from the end of the optical fiber cable with plug, namely the phenomenon of pistoning, may occur due to time-based changes or thermal hysteresis and the like of the optical fiber, coating and plug when the optical fiber cable is used. When this pistoning phenomenon occurs, the distance between the end of the optical fiber and the light source or light receiving element changes from its initial value resulting in a change in the amount of coupled light, which may cause problems.

On the other hand, such optical fiber cables are used vehicle mounting applications and in factory control equipment wiring applications. Since optical fiber cables used in such applications are exposed to environments in which lubricating oil, engine oil, and other organic solvents are used, they are required to have oil resistance. In order to impart oil resistance to optical fiber cables, a technology that uses an amide polymer for the coating layer is disclosed in Japanese Unexamined Patent Application, First Publication No. Sho 50-2552, Japanese Unexamined Patent Application, First Publication No. Hei 10-319281, and the like.

However, since these optical fiber cables do not have adequate flame resistance, there is the risk of these cables causing a fire to spread at the time of a fire. In addition, since the peel strength between the optical fiber and coating layer is low, pistoning phenomenon tended to occur easily in the case of using as an optical fiber cable with plug.

DISCLOSURE OF THE INVENTION

The object of the present invention is to provide an optical fiber cable having superior oil resistance and flame resistance, that is resistant to peeling of the optical fiber and coating layers, and to provide an optical fiber cable with plug that is resistant to the occurrence of pistoning phenomenon.

The optical fiber cable of the present invention is an optical fiber cable of diameter $D_1$ (mm) in which an adhesive layer having a thickness of 0.5 to 200 $\mu$m, a primary coating layer, and a secondary coating layer are sequentially formed around the outside of an optical fiber in which the outermost layer is composed of vinylidene fluoride polymer; wherein, in the case the diameter of the optical fiber is represented with Da (mm), the thickness of the adhesive layer is represented with d (mm), and Da+2d is represented with $D_2$, then $D_1/D_2$=1.2 to 3.5. The optical fiber may be composed of a core, a sheath formed around the core, and a protective layer formed around the sheath.

BEST MODE FOR CARRYING OUT THE INVENTION

The following provides a detailed explanation of the present invention.

The optical fiber cable of the present invention is an optical fiber cable in which an adhesive layer, a primary layer, and a secondary layer are sequentially formed around the outside of an optical fiber.

Figure 1:
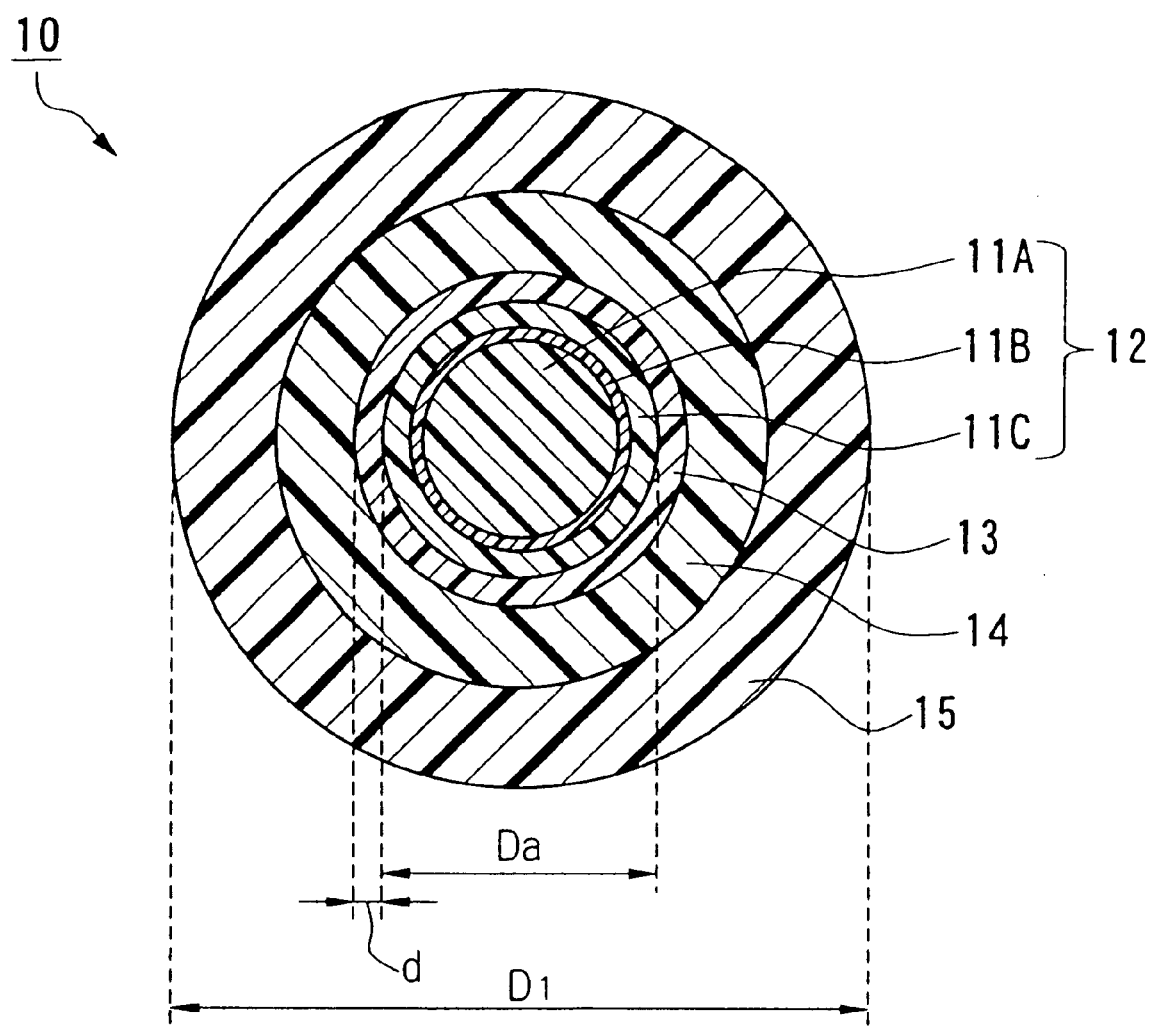
FIG. 1 is a cross-sectional view showing an example of an optical fiber cable of the present invention.

FIG. 1 is a cross-sectional view showing one mode of optical fiber cable 10 of the present invention. Adhesive layer 13 as well as primary coating layer 14 and secondary coating layer 15 are sequentially formed around the outside of optical fiber 12 comprising core 11A, sheath 11B, and protective layer 11C formed on the outside of sheath 11B.

An optical fiber having a known structure is used for the optical fiber 12, examples of which include an SI optical fiber having a core-sheath structure as shown in FIG. 1, a GI optical fiber in which the refractive index of core 11A gradually decreases from the center to the outside, a multi-layer optical fiber in which the refractive index of core 11A decreases in a stepwise manner from the center to the outside, and a multi-core optical fiber having a plurality of cores 11A in a single optical fiber 12. In order to widen the bandwidth of optical fiber 12 and perform high-speed signal transfer, it is preferable to use a multi-layer optical fiber. Furthermore, sheath 11B may be additionally coated around the outside of GI optical fibers or multi-layer optical fibers.

Various types of known highly transparent polymers used in optical fiber 12 are used for the core material, and preferably methyl methacrylate polymers are used. More preferable examples of core materials include methyl methacrylate homopolymers, copolymers having for their main component methyl methacrylate units, copolymers having for their main component benzyl methacrylate units, and fluorinated alkyl methacrylate polymers, with methyl methacrylate homopolymers being particularly preferable.

Known materials having a lower refractive index than the core material are used for the sheath material, preferable examples of which include copolymers of fluorinated alkyl (meth)acrylate units and methyl methacrylate units, polymers composed of α-fluoroacrylic esters, polymers containing a vinylidene fluoride unit, and blends composed of each of the polymers described above. Vinylidene fluoride homopolymers as well as copolymers composed of a vinylidene fluoride unit and various monomer units such as tetrafluoroethylene, propylene hexafluoride, acetone hexafluoride, ethylene, or propylene, are preferably used for the polymers containing a vinylidene fluoride unit. Moreover, as shown in FIG. 1, if an optical fiber is used that has protective layer 11C on the outside of sheath 11B, this is preferable because the amount of light incorporated in optical fiber 12 is increased.

Here, protective layer 11C refers to a light-transmitting layer that is laminated onto the outermost layer of optical fiber 12 and is able to contribute to the reflective refraction of light when light is transmitted through optical fiber 12. It is preferable that protective layer 11C be fused to core 11A with respect to an optical fiber 12 comprising only an inner layer, namely core 11A, or that protective layer 11C be fused to sheath 11B with respect to an optical fiber 12 having a core-sheath structure when producing optical fiber 12 so that each is substantially integrated into a single unit to tightly adhere the layers.

Known materials similar to sheath materials are used for the material of protective layer 11C, examples of which include copolymers comprising (meth)acrylates having short-chain fluorinated alkyl groups, (meth)acrylates having long-chain fluorinated alkyl A groups and various methyl methacrylate monomer units used in ordinary optical fibers 12 having a high angular aperture, as well as vinylidene fluoride polymers. Among these, vinylidene fluoride copolymers are used preferably because of the superior flexibility and solvent resistance of optical fiber cable 10.

Examples of vinylidene fluoride polymers that are used preferably include vinylidene fluoride homopolymers as well as copolymers composed of a vinylidene fluoride unit and various monomer units such as tetrafluoroethylene, propylene hexafluoride, acetone hexafluoride, ethylene, or propylene. In the case of using a copolymer composed of vinylidene fluoride units and tetrafluoroethylene units, it is preferable that the copolymer contain 70–90 mol % of the vinylidene fluoride unit to increase transparency. In addition, it is preferable to use a light-transmitting material for protective layer 11C that has a smaller refractive index than the material that forms the sheath in order to reduce bending loss of optical fiber 12.

This optical fiber 12 can be produced by a known method such as the melt spinning method.

In addition, in the case of using the optical fiber cable 10 of the present invention in a high-temperature environment of 70–80° C. or in an environment subject to extreme temperature differences, since pistoning is inhibited, it is preferable to use an optical fiber having a small coefficient of thermal contraction for optical fiber 12, and even more preferable to use an optical fiber 12 having a coefficient of contraction of 0 to 0.5% when heated for 50 hours with dry heat at 90° C. Such an optical fiber 12 having a small coefficient of thermal contraction can be obtained by, for example, heat treating optical fiber 12. Although this heat treatment can be performed continuously or for each batch, it is preferable to perform heat treatment for each batch for no more than 100 hours at a temperature such that glass transition starting temperature Tg, as measured in accordance with JIS K 7121-1987, of the core of optical fiber 12 and heat treatment temperature T satisfy the equation: $Tg-30 \leq T < Tg$.

In optical fiber cable 10 of the present invention, adhesive layer 13, primary coating layer 14, and secondary coating layer 15 are sequentially formed around the outside of optical fiber 12.

Here, adhesive layer 13 refers to a layer provided between optical fiber 12 and primary coating layer 14 that has a thickness of 0.5 to 200 μm, peel strength between itself and optical fiber 12 of 50 N or more, and peel strength between itself and primary coating layer 14 of 50 N or more. Although described in detail in the following embodiments, peel strength here refers to the force required to peel apart the interface of two layers.

When this adhesive layer 13 is provided, since primary layer 14 and optical fiber 12 can be firmly joined even if a material is used for primary coating layer 14 that does not have adequate adhesion with optical fiber 12, the degree of freedom in selecting the material used for primary coating layer 14 increases. Moreover, as a result of this, the degree of freedom in selecting the material used for secondary coating layer 15 also increases. Accordingly, by providing this adhesive layer 13, a material, for example, that does not have adequate adhesion with optical fiber 12 but has other superior properties such as superior flame resistance, can be used for primary coating layer 14, thereby making it possible to impart properties such as flame resistance to optical fiber cable 10. If the thickness of adhesive layer 13 is less than 0.5 μm, optical fiber 12 and primary coating layer 14 can no longer be firmly joined, while if the thickness of adhesive layer 13 exceeds 200 μm, various properties such as flame resistance and solvent resistance of optical fiber cable 10 decrease, it also increases the cost of the material used for adhesive layer 13. In addition, in the case of a layer having a peel strength of less than 50 N, optical fiber 12 and primary coating layer 14 cannot be firmly joined.

A material containing a polyamide polymer is preferably used for this adhesive layer 13. If a polyamide polymer is used, and particularly in the case primary coating layer 14 is formed from a material having for its main component a polyamide polymer, the peel strength between adhesive layer 13 and primary coating layer 14 can be further increased. Examples of polyamide polymers include homopolymers composed of monomer units such as nylon 10, nylon 11, nylon 12, nylon 6, and nylon 66, copolymers composed of combinations of these monomer units, and nylon elastomers which are copolymers containing nylon monomer units containing flexible segments. These may be used alone or in combinations of two or more types, and may also be used as a mixture with other polymers and compounds.

More specifically, copolymers composed of a nylon 12 unit and at least one nylon 6 unit and nylon 66 unit, mixtures of polyamide polymer and vinylidene fluoride polymer, nylon elastomers and mixtures of polyamide polymer and at least one organic acid and organic acid anhydride are preferable. When these are used, since they all have a low melting temperature, adhesive layer 13 can be formed around the outside of optical fiber 12 at a comparatively low temperature. Accordingly, the use of these polymers is preferable because adhesive layer 13 can be easily formed without causing thermal deterioration of the transmission performance of optical fiber 12.

In addition, materials containing these polymers have superior adhesion with vinylidene fluoride polymers. Accordingly, providing adhesive layer 13 with a material containing these polymers on optical fiber 12 in which the outermost layer is formed from vinylidene fluoride polymer is particularly preferable because it increases the peel strength between optical fiber 12 and adhesive layer 13.

Namely, since copolymers composed of a nylon 12 unit and at least one nylon 6 unit or nylon 66 unit have a comparatively large number of amide bonds with polar groups per molecule, interaction occurs with the polarity of the vinylidene fluoride polymer. Accordingly, when a material containing a copolymer composed of a nylon 12 unit and at least one nylon 6 unit and nylon 66 unit is used for adhesive layer 13, the peel strength between adhesive layer 13 and optical fiber 12 and the peel strength 15 between adhesive layer 13 and primary coating layer 14 are both superior. In particular, even more superior peel strength is obtained if a three-dimensional copolymer composed of a nylon 12 unit, nylon 6 unit, and nylon 66 unit is used.

If a mixture of polyamide polymer and vinylidene fluoride polymer is used, since the vinylidene fluoride polymer in this mixture and the vinylidene fluoride polymer of the outermost layer of optical fiber 12 easily adhere, adhesive layer 13 can be formed having large peel strength. In order for optical fiber cable 10 to have satisfactory heat-resistant dimensional stability, the content of polyamide polymer in the mixture of polyamide polymer and vinylidene fluoride polymer is preferably 50% by weight or more, and more preferably 95% by weight or less in order to sufficiently improve peel strength.

In addition, nylon elastomers have good flexibility and large elongation. Accordingly, if adhesive layer 13 is provided that is composed of a material containing nylon elastomer, when force is applied to optical fiber cable 10 that causes primary coating layer 14 to peel off stress occurring at the interface of optical fiber 12 and adhesive layer 13 as well as that occurring at the interface of adhesive layer 13 and primary coating layer 14 is alleviated and reduced, thereby peeling strength is substantially increased.

In addition, the mixture of polyamide polymer and at least one of organic acid and organic acid anhydride has high polarity, and in particular, in the case the outermost layer of optical fiber 12 is formed from a vinylidene fluoride polymer, interaction occurs with the polarity of the vinylidene fluoride polymer. Accordingly, adhesive layer 13 is formed that has extremely high peel strength. The polyamide polymer used here is preferably nylon 11 or nylon 12 polymer, and in particular, nylon 11 homopolymer or nylon 12 homopolymer is preferably used. Examples of organic acids includes methacrylic acid, acrylic acid, maleic acid, fumaric acid, salicylic acid, succinic acid, glutaric acid, and phthalic acid. Examples of organic acid anhydrides include anhydrides of these organic acids. The content of at least one of the organic acid and organic acid anhydride relative to 100 parts by weight of polyamide polymer is preferably 0.1 parts by weight or more in order to adequately improve peel strength, and preferably 10 parts by weight or less in order to maintain flexibility of the coating layers and preventing worsening of the handling ease of optical fiber cable 10.

Moreover, in the case a polyamide polymer having a nylon 11 or nylon 12 unit is used for primary coating layer 14, by forming adhesive layer 13 with a material that contains polyamide polymer having a nylon 11 unit, the peel strength between optical fiber 12 and adhesive layer 13, as well as the peel strength between adhesive layer 13 and primary coating layer 14, can be further increased.

Furthermore, nylon 11 in particular has superior properties in comparison with nylon 12 in terms of dynamic properties such as low-temperature impact strength, bending fatigue resistance, tensile rupture elongation, and low flexural elasticity, wear resistance, coefficient of linear expansion, and low gas permeability. Consequently, when nylon 11 is used for the polyamide polymer, an optical fiber cable 10 can be obtained that has superior flexibility and fatigue resistance, and low levels of pistoning in high-temperature environments as well as deterioration of transmission characteristics as compared with the case of using nylon 12. In addition, in the case of an adhesive layer containing nylon 12, although there is the risk of optical fiber cable 10 gradually hardening due to the progression of crystallization of nylon 12 after forming adhesive layer 13, the use of nylon 11, which has a melting point about 10° C. higher than nylon 12, is preferable because there is no hardening of optical fiber cable 10 whatsoever at a temperature of about 80° C., which is the upper limit on the normal use of optical fiber 12 in which PMMA is used as the core material. In addition, if nylon 11 is used for the adhesive layer, since nylon 11 has superior bending resistance and wear resistance, even in cases in which optical fiber cable 10 is deformed, dynamic action such as stress applied to optical fiber 12 as well as contraction of optical fiber 12 in high-temperature environments can be further inhibited. Moreover, in the case the outermost layer of optical fiber 12 is formed with a polymer having ester groups or highly polar C—F bonds such as fluorinated (meth)acrylate or vinylidene fluoride, it is more preferable to use nylon 11 for the adhesive layer. This is because, since nylon 11 has a larger amount of amide bonds per unit weight than nylon 12, strong interaction occurs between these amide bonds and the polarity of the outermost layer of optical fiber 12, enabling adhesive layer 13 to be formed which firmly joins with optical fiber 12 and primary coating layer 14.

Primary coating layer 14 is provided on the outside of adhesive layer 13 by strongly adhering with adhesive layer 13 and inhibits pistoning of optical fiber 12, and furthermore, secondary coating layer 15 is provided on the outside of primary coating layer 14 which can be peeled off comparatively easily as necessary such as during connecting work of optical fiber cable 10. By using materials having superior flame resistance and other properties required by optical fiber cable 10 for the primary coating layer 14 and secondary coating layer 15, optical fiber cable 10 can be given those properties.

A material containing a amide polymer having superior oil resistance, heat resistance and the like is preferably used for primary coating layer 14 and secondary coating layer 15. Examples of polyamide polymers include homopolymers composed of monomer units such as nylon 11, nylon 12, nylon 6, nylon 66, nylon 612, and nylon 621, polyamide copolymers composed of combinations of these monomer units, and nylon elastomers. Among these, nylon 11 homopolymers and nylon 12 homopolymers are preferably used because they have satisfactory moldability in the coating process and are unlikely to cause thermal and mechanical damage to optical fiber 12. In addition, a polyester elastomer may also be used alone for primary coating layer 14 and secondary coating layer 15. Alternatively, this may be used in combination with a polyamide polymer. Examples of polyester elastomers include "HYTREL" (trade name: DU PONT-TORAY CO., LTD.), "PELPRENE" (trade name: Toyobo Co., Ltd.) and "LUMOD" (trade name: General Electric Company).

In addition, the optical fiber cable 10 of the present invention preferably is provided with flame resistance to a degree that passes a flame resistance test in compliance with DIN 72251-5. In order to impart optical fiber cable 10 with this degree of flame resistant, it is preferable to use a material consisting of a mixture of 8 to 60 parts by weight of a triazine compound to 100 parts by weight of polyamide polymer for the material that forms primary coating layer 14 or secondary coating layer 15. More preferably, a material is used that consists of a mixture of 10 to 60 parts by weight of triazine compound to 100 parts by weight of polyamide polymer. If the amount of the triazine compound to be mixed is less than 8 parts by weight, there is the risk of the effect of improving flame resistance being inadequate, while if the amount of triazine compound to be mixed exceeds 60 parts by weight, the flexural modulus of elasticity increases excessively resulting in the risk of difficulties in handling optical fiber cable 10. The compound represented with the following chemical formula (1) is one example of that used for the triazine compound, and melamine-cyanuric acid is particularly preferable:

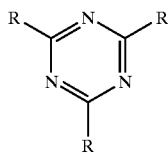

(1)

(wherein, R represents OH, $NH_2$ or $N(R^1)_2H$, and $R^1$ represents an aliphatic alkyl group).

In addition, other additives such as phosphorus compounds, antimony compounds, molding assistants and other typically added additives may be added to the polyamide polymer.

Furthermore, the flame resistant test to be measured in compliance with DIN 72551-5 refers to that in which the test of DIN 72551-5, which is a method of measuring flame resistance for electrical wires, has been slightly modified in the manner described below in order to measure the flame resistance of optical fiber cable 10. In this measurement method, it is necessary to hold electrical wire at an incline of 45° during or after combustion. However, optical fiber cable 10 differs from electrical wiring in that it is difficult to hold optical fiber cable 10 at an incline of 45° during or after combustion of optical fiber 12. Accordingly, flame resistance is measured while wrapping a pair of copper wires so as to be mutually crossing in the form of a spiral around optical fiber cable 10 in order to hold optical fiber cable 10 at an incline of 45° during or after combustion. Copper wire having a diameter of 0.7 mmΦ is used for the copper wire, and the spiraling period is 20 mm in the lengthwise direction of optical fiber cable 10. In addition, a criterion for determining the acceptability of the flame resistance test is such that if the flame goes out within 30 seconds after igniting optical fiber 12 and moving the flame away from the sample, the sample is acceptable, while if the flame does not go out within 30 seconds, the sample is not acceptable.

In addition, in the optical fiber cable 10 of the present invention, it is preferable that the peel strength of primary coating layer 14 and secondary coating layer 15 is 30 N or less, and more preferably from 2.9 to 30 N. If the peel strength is less than 2.9 N, optical fiber 12 with primary coating layer 14 easily comes apart from secondary coating layer 15, thereby tending to make handling difficult. On the other hand, if peel strength exceeds 30 N, stripping becomes poor, and primary coating 14 may stretch when peeling secondary coating layer 15 during connection work of optical fiber cable 10 and the like, thereby resulting in the risk of decreased handling ease. The peel strength of secondary coating layer 15 and primary coating layer 14 can be adjusted by suitably selecting the combination of materials used for primary coating layer 15 and materials used for primary coating 14 or by suitably selecting a coating method to be described later.

Furthermore, primary coating layer 14 and secondary coating layer 15 of optical fiber cable 10 may be composed of a single layer as in the example of FIG. 1, or they may be respectively composed of multiple layers. In the case primary coating layer 14 is composed of multiple layers, the peel strength between those layers is preferably 50 N or more, and more preferably 58.8 N or more. If the peel strength is less than 50 N, adhesion between layers is insufficient which may prevent the effect of providing adhesive layer 13 from being adequately demonstrated. In the case secondary coating layer 15 is composed of multiple layers, there are no particular restrictions on the peel strength between those layers.

In addition, by adding a dye and the like to secondary coating layer 15 that is the outermost layer of optical fiber cable 10 of the present invention, the ease of identification and design of optical fiber cable 10 can be easily enhanced. In this case, by using a material composed of nylon 11 or nylon 12 that does not contain an additive such as dye for primary coating layer 14, the additive contained in secondary coating layer 15 can be inhibited from migrating to optical fiber 12. As a result, deterioration of the transmission characteristics of optical fiber 12 caused by migration of this additive into optical fiber 12 can be prevented. Accordingly, by using this type of composition for optical fiber cable 10, various dyes and other additives can be selected for improving the ease of identification and design of optical fiber cable 10 while maintaining superior transmission characteristics.

In the optical fiber cable 10 of the present invention, in the case of representing the diameter of optical fiber cable 10 with $D_1$ (mm), the diameter of optical fiber 12 with Da (mm), the thickness of adhesive layer 13 with d (mm), and Da+2d with $D_2$, then $D_1/D_2$ is 1.2 to 3.5. If $D_1/D_2$ is less than 1.2, improvement of the characteristics of optical fiber cable 10 resulting from providing primary coating layer 14 and secondary coating layer 15 are inadequate. For example, even if a material having superior flame resistance is used for primary coating layer 14 and secondary coating layer 15, if $D_1/D_2$ is less than 1.2, the flame resistance of optical fiber cable 10 is inadequate. If $D_1/D_2$ exceeds 3.5, the flexibility of optical fiber cable 10 decreases resulting in poor handling. Consequently, it is difficult to install optical fiber cable 10 in confined areas, thereby making it unsuitable for automotive applications and the like.

Optical fiber cable 10 of the present invention can be produced by a known method, examples of which include a method in which adhesive layer 13, primary coating layer 14 and secondary coating layer 15 are sequentially provided on optical fiber 12 using a cross head coating apparatus, and a method in which a material that forms adhesive layer 13, primary coating layer 14 and secondary coating layer 15 is laminated on a material that forms optical fiber 12 by a method of multi-component fiber spinning. Among these, a method in which adhesive layer 13, primary coating layer 14, and secondary coating layer 15 are sequentially provided on optical fiber 12 using a cross head coating apparatus is preferable. In particular, a method in which adhesive layer 13 and primary coating layer 14 are collectively coated onto optical fiber 12 followed by coating secondary coating layer 15 is especially preferable. When done in this manner, the peel strength between adhesive layer 13 and primary coating layer 14 can be controlled to 50 N or more, and furthermore, peel strength between primary coating layer 14 and secondary coating layer 15 can be controlled to 30 N or less.

Figure 2:
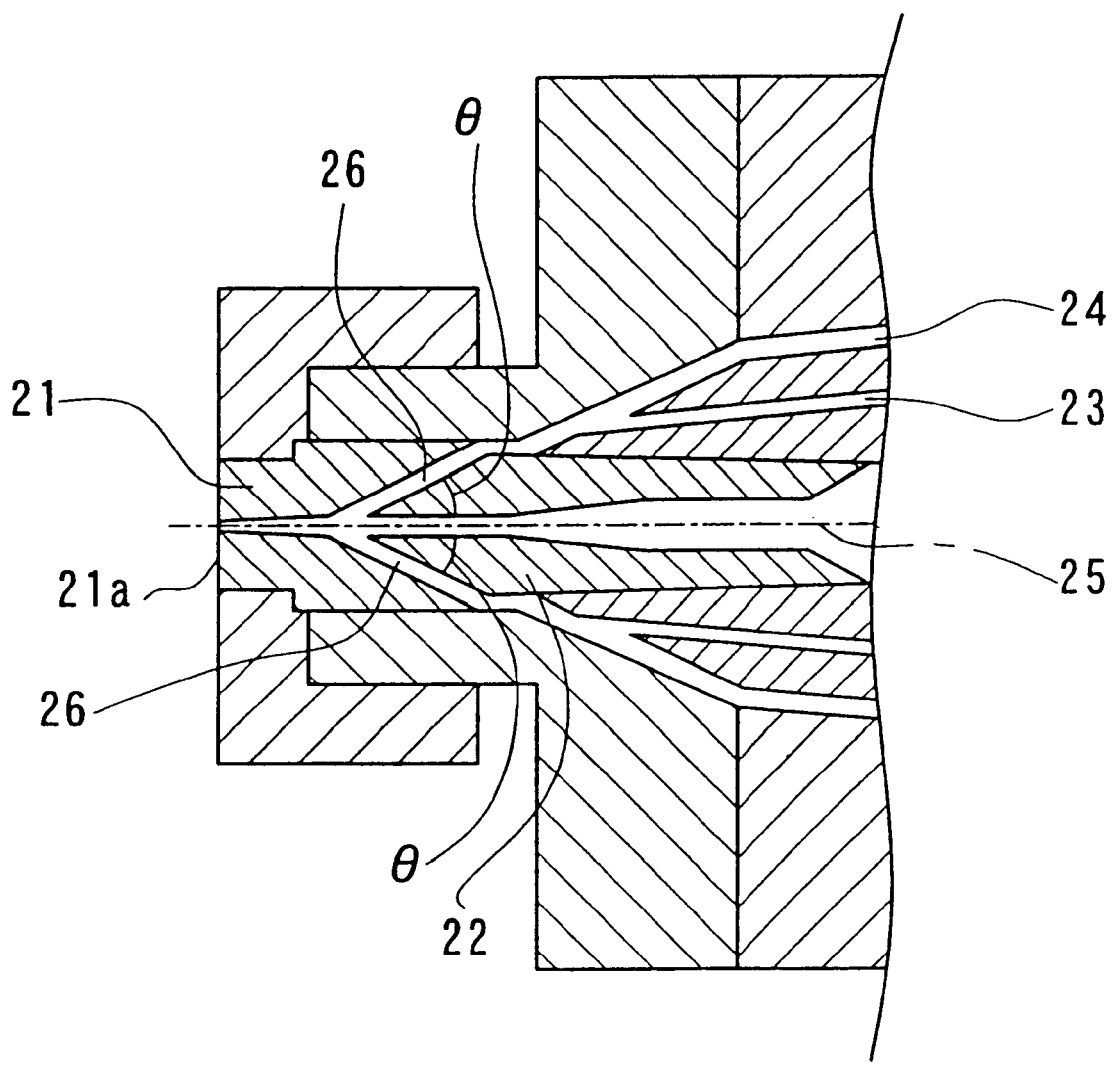
FIG. 2 is a longitudinal sectional view showing an example of a coating apparatus used when producing the optical fiber cable of the present invention.
Figure 3:
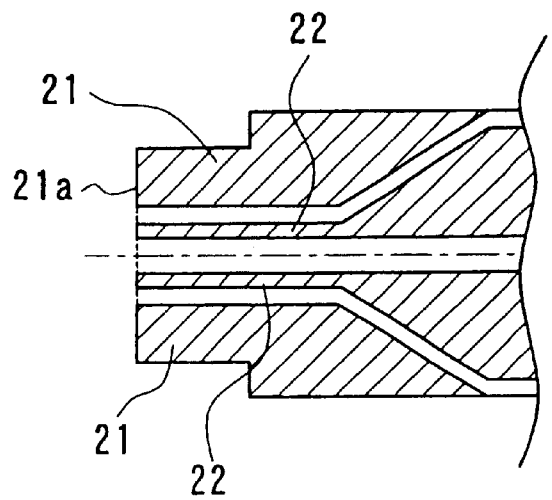
FIG. 3 is a longitudinal sectional view showing another example of a coating apparatus used when producing the optical fiber cable of the present invention.

In addition, peel strength can also be adjusted by the coating apparatus used. In order to increase peel strength, it is preferable to coat the coating layers using a cross head coating apparatus of the compression type as shown in FIG. 2 in which the end of nipple 22 is located to the inside of the end surface 21a of die 21. When coating adhesive layer 13, it is easy to increase the peel strength between optical fiber 12 and adhesive layer 13 to 50 N or more, thereby making it possible to sufficient suppress pistoning. Therefore, it is preferable to use a compression type coating apparatus. In order to make the peel strength comparative low, it is preferable to coat the coating layers using a cross head coating apparatus of the tubing type in which the end of nipple 22 is in the same plane as end surface 21a of die 21 as shown in FIG. 3. When coating the secondary coating layer, since the peel strength between primary coating layer 14 and secondary coating layer 15 can be lowered to 30 N or less, thereby improving the ease of stripping of optical fiber cable 10, the use of a tubing type of coating apparatus is preferable. Furthermore, these coating apparatuses can be suitably used according to the materials composing optical fiber 12, adhesive layer 13, and each of the coating layers as well as the required peel strength.

Consequently, it is more preferable to use a cross head coating apparatus of the compression type in which adhesive layer 13 and primary coating layer 14 are coated collectively as shown in FIG. 2 in order to increase the peel strengths between optical fiber 12 and adhesive layer 13 and between adhesive layer 13 and primary coating layer 14. As shown in FIG. 2, this coating apparatus is equipped with die 21 and nipple 22. When this apparatus is used, by feeding a material that forms adhesive layer 13 from a first flow path 23, and feeding a material that forms primary coating layer 14 from a second flow path 24, adhesive layer 13 and primary coating layer 14 can be collectively coated around optical fiber 12. Furthermore, in FIG. 2, reference symbol 25 represents the axis of optical fiber 12 that passes through the center of nipple 22.

In addition, in the case of using a material that contains a polyamide polymer for adhesive layer 13 and primary coating layer 14, the coating temperature is preferably from 200 to 220° C. If the temperature is lower than 200° C., the fluidity of the material is low, and as a result, moldability may decrease and also it leads to the risk of being unable to adequately increasing the peel strength between optical fiber 12 and adhesive layer 13. On the other hand, if the temperature exceeds 220° C., optical fiber 12 may melt and become deformed, and its optical characteristics may be deteriorated.

In addition, in a cross head coating apparatus, the angle $\theta$ formed by a third flow path 26, into which first flow path 23 and second flow path 24 merge, and optical fiber axis 25 is preferably from 30 to 60°. Namely, it is preferable that optical fiber 12 and the materials that form adhesive layer 13 and primary coating layer 14 make contact at an angle of 30 to 60°. If $\theta$ is smaller than 30°, it is difficult to coat adhesive layer 13 and primary coating layer 14 at a uniform thickness on optical fiber 12, while if $\theta$ is larger than 60°, the heat and stress applied to optical fiber 12 by the materials heated to a high temperature increase, which may cause deterioration of the optical characteristics of optical fiber 12. In the case of using nylon 11 or nylon 12 for the polyamide polymer, it is preferable to form third flow path 26 at an angle of 40 to 50° with respect to optical fiber axis 25.

Furthermore, when forming secondary coating layer 15 as well, the coating temperature and contact angle between the materials and optical fiber 12 are also preferably within the above ranges.

Moreover, in the case of using nylon 11 or nylon 12 for adhesive layer 13, adhesion between optical fiber 12 and adhesive layer 13 can be increased by controlling the thickness of die 21 used (distance to end surface 21a of die 21 from the position where the materials of optical fiber 12 and adhesive layer 13 make contact within the coating apparatus) and the aperture of die 21. The thickness of die 21 is preferably 3 to 7 mm, and more preferably 4 to 6 mm. Although the adhesion between optical fiber 12 and adhesive layer 13 can be increased the greater the thickness of die 21, if die 21 is excessively thick, the heat and stress applied to optical fiber 12 by the materials heated to a high temperature may cause deterioration of the optical characteristics of optical fiber 12. The diameter of the aperture of die 21 is preferably from 2.3 to 2.6 mm, and more preferably from 2.35 to 2.5 mm, in the case of producing, for example, an optical fiber cable 10 having a diameter of 2.2 mm. Namely, the diameter of the aperture of die 21 is preferably about 104 to 118%, and more preferably 107 to 114%, of the diameter of optical fiber cable 10. Although adhesion between optical fiber 12 and adhesive layer 13 can be increased the smaller the diameter of the aperture of die 21, if the diameter of the aperture of die 21 is about equal to the diameter of optical fiber cable 10, the heat and stress applied to optical fiber 12 by the materials heated to a high temperature may cause deterioration of the optical characteristics of optical fiber 12. If coating is carried out under draw-down conditions such that the diameter of the aperture of die 21 is about 104 to 118% of the diameter of optical fiber cable 10, optical fiber cable 10 can be produced having superior adhesion between optical fiber 12 and adhesive layer 13 as well as superior optical characteristics.

The optical fiber cable with plug of the present invention has a plug connected to at least one end of the above optical fiber cable 10. The plug can be selected from known plugs according to the application. A fastening (caulking) mechanism, for example, can be used as the mechanism for anchoring the plug to optical fiber cable 10. It is preferable that a plug having high mechanical strength be used for the plug.

EXAMPLES

Although the following provides an explanation of the present invention through its examples, the scope of the present invention is not limited to these embodiments.

Measurement methods of examples will be explained as follows.

Flame Resistance

Flame resistance was measured based on the previously described measurement method in compliance with DIN72551-5.

The number of test cables inspected and the number of acceptable test cables are shown in the tables.

Peel Strength

Figure 4:
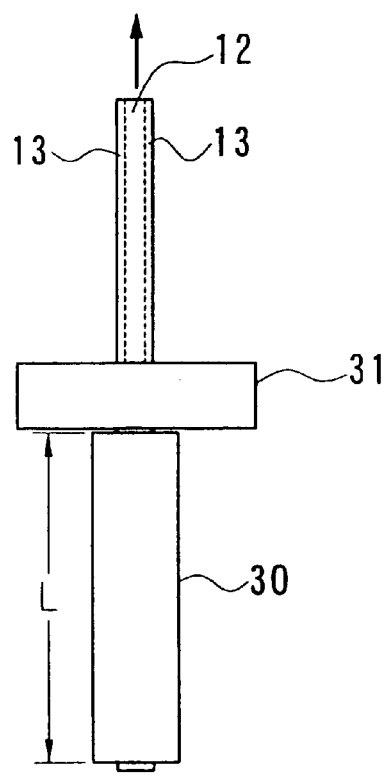
FIG. 4 is a side view showing a method for measuring peel strength in the embodiments.

An explanation of the method for measuring peel strength is provided with reference to FIG. 4.

A test optical fiber cable 30 was prepared in which the coating on one end is peeled back, the coating on the other end is not peeled back, and the length L of the coated portion is 30 mm.

(1) Furthermore, in the case of measuring the peel strength between optical fiber 12 and adhesive layer 13 or between adhesive layer 13 and primary coating layer 14, the above test optical fiber cable 30 was used after peeling apart primary coating layer 14 and secondary coating layer 15.

As shown in FIG. 4, the coated portion of optical fiber cable 30 was clamped in clamping jig 31, optical fiber 12 was clamped in an extraction apparatus having a mechanism capable of measuring stress not shown, and then pulled out at a constant rate of 100 mm/min towards the direction along its central axis (direction of the arrow in the drawing). At this time, only the interface having the lower peel strength among the peel strength between optical fiber 12 and adhesive layer 13 and between adhesive layer 13 and primary coating layer 14 separates. The peel strength of the interface that did not separate is then equal or greater to the peel strength of the separated interface.

The peak value of the force during extraction is read from a curve obtained by plotting the pulling force at this time and the amount of shift of the coating layer in the direction of pulling of optical fiber 12, and that value is taken to be the measured value.

(2) On the other hand, in the case of measuring the peel strength between primary coating layer 14 and secondary coating layer 15, test optical fiber cable 30 was used while only peeling apart secondary coating layer 15. The measured value was then obtained in the same manner as (1) above with the exception of only pulling out optical fiber 12 equipped with primary coating layer 14 and adhesive layer 13 from secondary coating layer 15.

Solvent Resistance

Optical fiber cable 10 was immersed for 1000 hours in gasoline at 25° C., and the increase in transmission loss caused by that immersion (dB/km) was measured from the difference between transmission loss of optical fiber cable 10 after immersion and transmission loss of optical fiber cable 10 before immersion.

Wire Stripper Separation (Indicated as WS Separation in the Tables)

Secondary coating layer 15 was separated from optical fiber cable 10 and the status of primary coating layer 14 at the separated portion was assessed visually. Wire stripper separation was judged as being acceptable (indicated with ○ in the tables) if there were no abnormalities such as stretching or damage in primary coating layer 14.

Pistoning

A pistoning test was carried out by peeling off secondary coating layer 15 from the end of optical fiber cable 10 to expose primary coating layer 14, attaching a plug having an inner diameter 50 μm larger than the diameter of primary coating layer 14 to this end and fastening (caulking) to primary coating layer 14 to form an optical fiber cable with plug having a length of 50 cm. This was then allowed to stand for 1000 hours in an atmosphere at 85° C. and 95% relative humidity followed by measurement of the length (μm) by which optical fiber 12 later protruded or retracted from the end surface.

Example 1

Using a methylmethacrylate (MMA) homopolymer for the core material, a copolymer of 2,2,2-trifluoroethylmethacryulate (3FM)/1,1,2,2-tetrahydroperfluorodecylmethacrylate (17FM/MMA/methacrylic acid (MAA) at a ratio of 30/50/18/2 (percent by weight) for the sheath material, and a copolymer of vinylidene fluoride/tetrafluoroethylene/6-propylene fluoride at a ratio of 70/20/10 (mol %) for the material of protective layer 11C., these materials were melted, sequentially laminated in concentric fashion starting from the center and compound spun to obtain optical fiber 10 having a core diameter of 970 μm, sheath thickness of 5 μm and protective layer thickness of 10 μm.

Next, using a copolymer of nylon 12/nylon 6/nylon 66 ("VESTAMELT 171", DAICEL-HÜLS LTD.) containing carbon black for adhesive layer 13, and a mixture of 20 parts by weight of melamine isocyanurate contained in 100 parts by weight of nylon 12 ("DAIAMID 12 L1640", DAICEL-HÜGLS LTD.) for primary coating layer 14, these two material were supplied to the compression type, two-layer collective coating cross head coating apparatus of FIG. 2 and collectively coated around optical fiber 12 to an outer diameter of 1.5 mm. The coating temperature at this time was 210° C., the angle θ formed between third flow path 26 and optical fiber axis 25 was 45°, the thickness of die 21 was 3 mm, and the diameter of the aperture of die 21 was 2.4 mm.

Moreover, the same material as primary coating layer 14 was supplied to a cross head coating apparatus using the tubing method as shown in FIG. 3 to form secondary coating layer 15, and optical fiber cable 10 having an outer diameter of 2.2 mm is obtained. The coating temperature at this time was 210° C., the angle θ formed between third flow path 26 and optical fiber axis 25 was 45°, the thickness of die 21 was 3 mm, and the diameter of the aperture of die 21 was 2.4 mm.

The transmission loss of the resulting optical fiber cable 10 was satisfactory at 122 dB/km.

In addition, this optical fiber cable 10 was measured for flame resistance, peel strength, solvent resistance, wire stripper separation and pistoning. The composition of optical fiber cable 10 and the results of these evaluations are shown in Tables 1 and 5.

Examples 2–13 and Comparative Examples 1–3

With the exception of changing the materials and thicknesses used for adhesive layer 13, primary coating layer 14, and secondary coating layer 15 as shown in Tables 1 through 4, optical fiber cables 10 were produced in the same manner as Example 1 followed by measurement of transmission loss, flame resistance, peel strength, solvent resistance, wire stripper separation, and pistoning. The compositions of optical fiber cables 10 along with the results of their evaluation are shown in Tables 1 through 8.

Furthermore, the abbreviations used in the tables refer to the materials indicated below.

(A) Polymethylmethacrylate (PMMA)
(B) Copolymer of 3FM/17FM/MMA/MAA=30/50/18/2% by weight
(C) Copolymer of VDF/TFE/6FPP=70/20/10 mol %
(D) Copolymer of methyl-α-fluoroacrylate/tetrafluoropropyl-α-fluoroacrylate=15/85 mol %

3FM: Trifluoroethylmethacrylate
1,1,2,2-tetrahydro perfluorodecanylmethacrylate
MMA: Methylmethacrylate
MAA: Methacrylic acid
VDF: Vinylidene fluoride
TFE: Tetrafluoroethylene
VDF/TFE copolymer (1): Copolymer of VDF/TFE=85/15 mol %
VDF/TFE copolymer (2): Copolymer of VDF/TFE=80/20 mol %
6-FPP: 6-fluorinated propylene
ICM: Melamine isocyanurate
Ny: nylon
Ny11: nylon 11 (ATOFINA Japan K.K., "BMN O")
Ny12/Ny6/Ny66 copolymer: "VESTAMELT 171" (DAICEL-HÜLS LTD.)
nylon 12 elastomer: "DAIAMID X4442" (DAICEL-HÜLS LTD.)

In addition, the outer diameter of the optical fiber in Comparative Example 3 is represented with $D_2$ in Table 2.

TABLE 1

|  |  | Ex. 1 | Ex. 2 | Ex. 3 | Ex. 4 |
|---|---|---|---|---|---|
| Optical fiber | Core | (A) | (A) | (A) | (A) |
|  | Sheath | (B) | (B) | (B) | (B) |
|  | Protective layer | (C) | (C) | (C) | (C) |
|  | Outer diam./μm | 1000 | 1000 | 1000 | 1000 |
| Adhesive layer | Material | Ny12/Ny6/Ny66 copolymer | Mixture of Ny12 and VDF/TFE copolymer (1) (50:50 weight ratio) | Nylon 12 elastomer | Mixture of Ny12 and MAA (100:1.5 weight ratio) |
|  | Thickness/μm | 100 | 50 | 50 | 20 |
| Primary coating layer | Material | Mixture of Ny12 and ICM (100:20 weight ratio) | Mixture of Ny12 and ICM (100:20 weight ratio) | Mixture of Ny12 and ICM (100:20 weight ratio) | Mixture of Ny12 and ICM (100:20 weight ratio) |
|  | Outer diam./mm | 1.5 | 1.5 | 1.5 | 1.6 |
| Secondary coating layer | Material | Mixture of Ny12 and ICM (100:20 weight ratio) | Mixture of Ny12 and ICM (100:20 weight ratio) | Mixture of Ny12 and ICM (100:20 weight ratio) | Mixture of Ny12 and ICM (100:20 weight ratio) |
|  | Outer diam./mm | 2.2 | 2.2 | 2.2 | 2.2 |
| $D_1/D_2$ |  | 1.83 | 2 | 2 | 2.12 |

TABLE 2

|  |  | Ex. 5 | Ex. 6 | Comp. Ex. 1 | Comp. Ex. 2 | Comp. Ex. 3 |
|---|---|---|---|---|---|---|
| Optical fiber | Core | (A) | (A) | (A) | (A) | (A) |
|  | Sheath | (B) | (B) | (B) | (B) | (B) |
|  | Protective layer | (C) | (C) | (C) | (C) | (C) |
|  | Outer diam./μm | 1000 | 1000 | 1000 | 1000 | 1000 |
| Adhesive layer | Material | Copolymer of Ny12/Ny6/Ny66 | Copolymer of Ny12/Ny6/Ny66 | Copolymer of Ny12/Ny6/Ny66 | Copolymer of Ny12/Ny6/Ny66 | None |
|  | Thickness/μm | 50 | 50 | 250 | 150 | — |
| Primary coating layer | Material | Mixture of Ny12 and ICM (100:10 weight ratio) | Mixture of Ny12 and ICM (100:40 weight ratio) | Mixture of Ny12 and ICM (100:20 weight ratio) | Mixture of Ny12 and ICM (100:20 weight ratio) | Mixture of Ny12 and ICM (100:20 weight ratio) |
|  | Outer diam./mm | 1.5 | 1.5 | 1.5 | 1.4 | 1.5 |
| Secondary coating layer | Material | Mixture of Ny12 and ICM (100:10 weight ratio) | Mixture of Ny12 and ICM (100:40 weight ratio) | Mixture of Ny12 and ICM (100:20 weight ratio) | Mixture of Ny12 and ICM (100:20 weight ratio) | Mixture of Ny12 and ICM (100:20 weight ratio) |
|  | Outer diam./mm | 2.2 | 2.2 | 2.2 | 1.5 | 2.2 |
| $D_1/D_2$ |  | 2 | 2 | 1.47 | 1.15 | 2.2 |

TABLE 3

|  |  | Ex. 7 | Ex. 8 | Ex. 9 |
|---|---|---|---|---|
| Optical fiber | Core | (A) | (A) | (A) |
|  | Sheath | VDF/TFE copolymer (2) | (C) | (C) |
|  | Protective layer | None | VDF/TFE copolymer (2) | None |
|  | Outer diam./μm | 1000 | 1000 | 750 |
| Adhesive layer | Material | Mixture of Ny12 and copolymer of Ny12/Ny6/Ny66 (50:50 weight ratio) | Mixture of Ny11 and copolymer of Ny12/Ny6/Ny66 (80:20 weight ratio) | Mixture of Ny11 and maleic anhydride (98:2 weight ratio) |
|  | Thickness/μm | 80 | 70 | 100 |
| Primary coating layer | Material | Ny11 | Mixture of Ny12 and ICM | Mixture of Ny11 and ICM |

TABLE 3-continued

|  |  | Ex. 7 | Ex. 8 | Ex. 9 |
|---|---|---|---|---|
|  |  | (100:20 weight ratio) | (100:20 weight ratio) |  |
|  | Outer diam./mm | 1.5 | 1.6 | 1.4 |
| Secondary coating layer | Material | Mixture of Ny12 and ICM (100:20 weight ratio) | Mixture of Ny12 and ICM (100:20 weight ratio) | Mixture of Ny6/Ny12 copolymer and ICM (100:20 weight ratio) |
|  | Outer diam./mm | 2.2 | 2.2 | 1.8 |
| $D_1/D_2$ |  | 1.9 | 1.9 | 1.9 |

TABLE 4

|  |  | Ex. 10 | Ex. 11 | Ex. 12 | Ex. 13 |
|---|---|---|---|---|---|
| Optical fiber | Core | (A) | (A) | (A) | (A) |
|  | Sheath | (B) | (D) | VDF/TFE copolymer (2) | (B) |
|  | Protective layer | VDF/TFE copolymer (2) | VDF/TFE copolymer (2) | (C) | (C) |
|  | Outer diam./μm | 1000 | 1000 | 500 | 1000 |
| Adhesive layer | Material | Mixture of Ny11 and Ny12/Ny6/N66 copolymer (75:25 weight ratio) | Mixture of Ny11 and Ny12/Ny6/N66 copolymer (90:10 weight ratio) | Ny12/Ny6/N66 copolymer | Ny11 |
|  | Thickness/μm | 100 | 100 | 90 | 100 |
| Primary coating layer | Material | Mixture of Ny12 and ICM (100:20 weight ratio) | Mixture of Ny12 and ICM (100:20 weight ratio) | Mixture of Ny11 and ICM (100:20 weight ratio) | Mixture of Ny12 and ICM (100:20 weight ratio) |
|  | Outer diam./mm | 1.8 | 1.4 | 1.2 | 1.5 |
| Secondary coating layer | Material | Mixture of nylon 12 elastomer and ICM (100:20 weight ratio) | Mixture of Ny6/Ny12 copolymer and ICM (100:20 weight ratio) | Mixture of Ny6/Ny12 copolymer and ICM (100:20 weight ratio) | Mixture of Ny12 and ICM (100:20 weight ratio) |
|  | Outer diam./mm | 2.2 | 1.5 | 2.2 | 2.2 |
| $D_1/D_2$ |  | 1.8 | 1.25 | 3.2 | 1.83 |

TABLE 5

|  | Ex. 1 | Ex. 2 | Ex. 3 | Ex. 4 | Ex. 5 | Ex. 6 |
|---|---|---|---|---|---|---|
| Transmission loss (dB/km) | 122 | 125 | 126 | 128 | 123 | 130 |
| Flame resistance (no. acceptable/no. tested) | 20/20 | 20/20 | 20/20 | 20/20 | 20/20 | 20/20 |
| Solvent resistance (dB/km) | 122 | 124 | 125 | 125 | 123 | 128 |
| Peel strength (1) (N) | 80 | 80 | 80 | 80 | 80 | 80 |

TABLE 5-continued

|  | Ex. 1 | Ex. 2 | Ex. 3 | Ex. 4 | Ex. 5 | Ex. 6 |
|---|---|---|---|---|---|---|
| (1) (N) | or more | or more | or more | or more | or more | or more |
| Peel strength (2) (N) | 20 | 20 | 20 | 20 | 20 | 20 |
| WS separation | ○ | ○ | ○ | ○ | ○ | ○ |
| Pistoning (μm) | 0 | 0 | 0 | 0 | 0 | 0 |

TABLE 6

|  | Comp. Ex. 1 | Comp. Ex. 2 | Comp. Ex. 3 |
|---|---|---|---|
| Transmission loss (dB/km) | 123 | 129 | 123 |
| Flame resistance (no. acceptable/no. tested) | 15/20 | 3/20 | 20/20 |
| Solvent resistance (dB/km) | 124 | 130 | 126 |
| Peel strength (1) (N) | 80 or more | 80 or more | 20 |
| Peel strength (2) (N) | 20 | 20 | 20 |
| WS separation | ○ | ○ | ○ |
| Pistoning (μm) | 0 | 0 | −40 |

Peel strength (1): Peel strength between adhesive layer and optical fiber or between adhesive layer and primary coating layer Peel strength (2): Peel strength between primary coating layer and secondary coating layer

TABLE 7

|  | Ex. 7 | Ex. 8 | Ex. 9 | Ex. 10 | Ex. 11 | Ex. 12 |
|---|---|---|---|---|---|---|
| Transmission loss (dB/km) | 125 | 129 | 128 | 126 | 122 | 135 |
| Flame resistance (no. acceptable/no. tested) | 20/20 | 20/20 | 20/20 | 20/20 | 20/20 | 20/20 |
| Solvent resistance (dB/km) | 125 | 130 | 127 | 127 | 122 | 136 |
| Peel strength (1) (N) | 80 or more | 80 or more | 80 or more | 80 or more | 80 or more | 80 or more |
| WS separation | ○ | ○ | ○ | ○ | ○ | ○ |
| Pistoning (μm) | 0 | 0 | 0 | 0 | 0 | 0 |

TABLE 8

|  | Example 13 |
|---|---|
| Transmission loss (dB/km) | 125 |
| Flame resistance (no. acceptable/no. tested) | 20/20 |
| Solvent resistance (dB/km) | 124 |
| Peel strength (1) (N) | 80 or more |
| Peel strength (2) (N) | 20 |
| WS separation | ○ |
| Pistoning (μm) | 0 |

In this manner, in addition to the optical fiber cables 10 of the present examples having superior flame resistance, there was also no occurrence of pistoning.

Industrial Applicability

As has been explained above, the optical fiber cable of the present invention is an optical fiber cable having a diameter $D_1$ (mm) in which is sequentially formed an adhesive layer having a thickness of 0.5 to 200 μm, a primary coating layer and a secondary coating layer around the outside of an optical fiber having an outermost layer composed of vinylidene fluoride polymer, such that in the case the diameter of the optical fiber is represented with Da (mm), the thickness of the adhesive layer is represented with d (mm) and Da+2d is represented with $D_2$, then $D_1/D_2=1.2$ to 3.5. Accordingly, an optical fiber cable with plug can be provided that has superior flame resistance, is resistant to peeling of the optical fiber and coating layers, is resistant to the occurrence of pistoning phenomenon and has superior oil resistance.

Thus, it is preferably used in optical signal transmission lines, computer connection lines for high-speed optical communications, lines around exchanges, lines for factory automated machinery control, data transmission lines for automobiles and other moving vehicles, optical sensor lines and the like. Furthermore, the optical fiber used may be composed of a core, a sheath formed around the core, and a protective layer formed around the sheath.

The present invention can be worked in various other forms provided it does not deviate from its spirit or major characteristics. Consequently, the previously mentioned embodiments merely indicate examples of the present with respect to all of their points and should not be interpreted to limit the present invention in any way. The scope of the present invention is indicated by the claims, and is not constricted in any way in the text of the specification. Moreover, any alterations or changes falling within the equivalent scope of the claims are considered to be within the scope of the present invention.

What is claimed is:

1. An optical fiber cable of diameter $D_1$ (mm) in which an adhesive layer having a thickness of 0.5 to 200 μm, a primary coating layer, and a secondary coating layer are sequentially formed around the outside of an optical fiber in which the outermost layer is composed of vinylidene fluoride polymer;

wherein, in the case the diameter of the optical fiber is represented with Da (mm), the thickness of the adhesive layer is represented with d (mm), and Da+2d is represented with $D_2$, then $D_1/D_2=1.2$ to 3.5.

2. An optical fiber cable of diameter $D_1$ (mm) in which an adhesive layer having a thickness of 0.5 to 200 μm, a primary coating layer, and a secondary coating layer are sequentially formed around the outside of an optical fiber composed of a core, a sheath formed around the core, and a protective layer formed around the sheath;

wherein, in the case the diameter of the optical fiber is represented with Da (mm), the thickness of the adhesive layer is represented with d (mm), and Da+2d is represented with $D_2$, then $D_1/D_2=1.2$ to 3.5.

3. The optical fiber cable according to claim 1, wherein the primary coating layer and secondary coating layer are composed of a material containing polyamide polymer.

4. The optical fiber cable according to claim 2, wherein the primary coating layer and secondary coating layer are composed of a material containing polyamide polymer.

5. The optical fiber cable according to claim 1, being acceptable of a flame resistance test in compliance with DIN 72551-5.

6. The optical fiber cable according to claim 2, being acceptable of a flame resistance test in compliance with DIN 72551-5.

7. The optical fiber cable according to claim 1, wherein at least one of the primary coating layer and the secondary coating layer is composed of a material in which 8 to 60 parts by weight of triazine compound is mixed with respect to 100 parts by weight of polyamide polymer.

8. The optical fiber cable according to claim 2, wherein at least one of the primary coating layer and the secondary coating layer is composed of a material in which 8 to 60 parts by weight of triazine compound is mixed with respect to 100 parts by weight of polyamide polymer.

9. The optical fiber cable according to claim 1, wherein the adhesive layer is composed of a material containing a copolymer comprised of a nylon 12 unit and at least one of nylon 6 unit and nylon 66 unit.

10. The optical fiber cable according to claim 2, wherein the adhesive layer is composed of a material containing a copolymer comprised of a nylon 12 unit and at least one of nylon 6 unit and nylon 66 unit.

11. The optical fiber cable according to claim 1, wherein the adhesive layer is composed of a material containing nylon elastomer.

12. The optical fiber cable according to claim 2, wherein the adhesive layer is composed of a material containing nylon elastomer.

13. The optical fiber cable according to claim 1, wherein the adhesive layer is composed of a material containing polyamide polymer and vinylidene fluoride polymer.

14. The optical fiber cable according to claim 2, wherein the adhesive layer is composed of a material containing polyamide polymer and vinylidene fluoride polymer.

15. The optical fiber cable according to claim 1, wherein the adhesive layer is composed of a material containing nylon 12 polymer and at least one of organic acid and organic acid anhydride.

16. The optical fiber cable according to claim 2, wherein the adhesive layer is composed of a material containing nylon 12 polymer and at least one of organic acid and organic acid anhydride.

17. The optical fiber cable according to claim 1, wherein the adhesive layer is composed of a material containing nylon 11.

18. The optical fiber cable according to claim 2, wherein the adhesive layer is composed of a material containing nylon 11.

19. An optical fiber cable with plug comprising a plug connected to at least one end of the optical fiber cable according to claim 1.

20. An optical fiber cable with plug comprising a plug connected to at least one end of the optical fiber cable according to claim 2.

* * * * *

UNITED STATES PATENT AND TRADEMARK OFFICE
CERTIFICATE OF CORRECTION

PATENT NO.    : 6,453,104 B1  
DATED         : September 17, 2002  
INVENTOR(S)   : Katsuhiko Shimada et al.

It is certified that error appears in the above-identified patent and that said Letters Patent is hereby corrected as shown below:

<u>Title page,</u>  
Item [22], PCT Filed, "Dec. 28, 1999" should read -- Dec. 28, 2000 --.

Signed and Sealed this

Second Day of December, 2003

JAMES E. ROGAN  
*Director of the United States Patent and Trademark Office*